US012320159B2

(12) United States Patent
Kumar et al.

(10) Patent No.: US 12,320,159 B2
(45) Date of Patent: *Jun. 3, 2025

(54) AXIAL CLUTCH MECHANISM

(71) Applicant: Schlage Lock Company LLC, Carmel, IN (US)

(72) Inventors: Tejas V. Kumar, Bangalore (IN); Paul R. Arlinghaus, Fishers, IN (US); Nelson Jenkins, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,698

(22) Filed: Jun. 13, 2023

(65) Prior Publication Data

US 2024/0125149 A1 Apr. 18, 2024

Related U.S. Application Data

(63) Continuation of application No. 16/867,030, filed on May 5, 2020, now Pat. No. 11,674,335.

(51) Int. Cl.

| | |
|---|---|
| ***E05B 47/06*** | (2006.01) |
| ***E05B 17/04*** | (2006.01) |
| ***E05B 17/22*** | (2006.01) |
| ***E05B 47/00*** | (2006.01) |

(52) U.S. Cl.

CPC ........ *E05B 47/0661* (2013.01); *E05B 17/044* (2013.01); *E05B 17/226* (2013.01); *E05B 47/0012* (2013.01); *E05B 47/0665* (2013.01); *E05B 47/068* (2013.01);

(Continued)

(58) Field of Classification Search

CPC .... E05B 17/044; E05B 17/045; E05B 17/226; E05B 47/0012; E05B 47/0661; E05B 47/0665; E05B 47/0673; E05B 47/0676; E05B 47/0684; E05B 47/0692;

(Continued)

(56) References Cited

U.S. PATENT DOCUMENTS 7,543,469 B1 6/2009 Tseng et al.
7,770,423 B2 * 8/2010 Wu .................... E05B 47/0012 70/279.1
7,827,837 B2 11/2010 Huang et al.

(Continued)

*Primary Examiner* — Christopher J Boswell
(74) *Attorney, Agent, or Firm* — Taft Stettinius & Hollister LLP

(57) ABSTRACT

An exemplary trim assembly comprises an escutcheon, a drive spindle, a lock mechanism, a cam mechanism, and a driver. The drive spindle is mounted to the escutcheon for rotation about a longitudinal axis. The lock mechanism includes a lock gear movably mounted in the escutcheon. The cam mechanism includes a first cam defined by the escutcheon and a second cam defined by the lock gear. The driver is operable to rotate the lock gear between a first rotational position and a second rotational position. The cam mechanism is configured to longitudinally drive the lock gear from a first longitudinal position to a second longitudinal position as the lock gear rotates from the first rotational position to the second rotational position. Movement of the lock gear between the first longitudinal position and the second longitudinal position transitions the lock mechanism between a locked state and an unlocked state.

21 Claims, 11 Drawing Sheets

(52) U.S. Cl.
CPC . *E05B 2047/002* (2013.01); *E05B 2047/0024* (2013.01); *E05B 2047/0026* (2013.01)

(58) Field of Classification Search
CPC ....... E05B 2047/002; E05B 2047/0024; E05B 2047/0026; E05B 2047/003
See application file for complete search history.

(56) References Cited

U.S. PATENT DOCUMENTS

| | | | | |
|---|---|---|---|---|
| 8,141,400 | B2 | 3/2012 | Sorensen et al. | |
| 9,051,762 | B2 | 6/2015 | Huang et al. | |
| 9,464,458 | B2 | 10/2016 | Huang et al. | |
| 10,385,588 | B2 * | 8/2019 | Huang | E05B 47/0012 |
| 10,563,705 | B2 * | 2/2020 | Lu | F16D 21/06 |
| 10,597,902 | B2 | 3/2020 | Guo et al. | |
| 11,443,572 | B2 | 9/2022 | Kusanale et al. | |
| 11,674,335 | B2 * | 6/2023 | Kumar | E05B 47/0661 70/278.7 |
| 11,788,322 | B2 * | 10/2023 | Chan | E05B 47/02 70/277 |
| 2004/0177660 | A1 | 9/2004 | Tsai | |
| 2011/0259059 | A1 | 10/2011 | Wu et al. | |
| 2024/0018803 | A1 * | 1/2024 | Niegmann | E05B 47/068 |

* cited by examiner

AXIAL CLUTCH MECHANISM

CROSS-REFERENCE TO RELATED APPLICATIONS

The present application is a continuation of U.S. patent application Ser. No. 16/867,030 filed May 5, 2020 and issued as U.S. Pat. No. 11,674,335, the contents of which are incorporated herein by reference in their entirety.

TECHNICAL FIELD

The present disclosure generally relates to locksets, and more particularly but not exclusively relates to trim assemblies for locksets.

BACKGROUND

Electronic locksets typically include an electromechanical driver (e.g., a motor or a solenoid) operable to transition the lockset between a locked state and an unlocked state. However, it has been found that certain existing electronic locksets are prone to binding, which can prevent the lockset from transitioning between its locked state and its unlocked state. This binding is often due to the generation of eccentric forces in the locking mechanism itself. For these reasons among others, there remains a need for further improvements in this technological field.

SUMMARY

An exemplary trim assembly comprises an escutcheon, a drive spindle, a lock mechanism, a cam mechanism, and a driver. The drive spindle is mounted to the escutcheon for rotation about a longitudinal axis. The lock mechanism includes a lock gear movably mounted in the escutcheon. The cam mechanism includes a first cam defined by the escutcheon and a second cam defined by the lock gear. The driver is operable to rotate the lock gear between a first rotational position and a second rotational position. The cam mechanism is configured to longitudinally drive the lock gear from a first longitudinal position to a second longitudinal position as the lock gear rotates from the first rotational position to the second rotational position. Movement of the lock gear between the first longitudinal position and the second longitudinal position transitions the lock mechanism between a locked state and an unlocked state. Further embodiments, forms, features, and aspects of the present application shall become apparent from the description and figures provided herewith.

DETAILED DESCRIPTION OF ILLUSTRATIVE EMBODIMENTS

Figure 1:
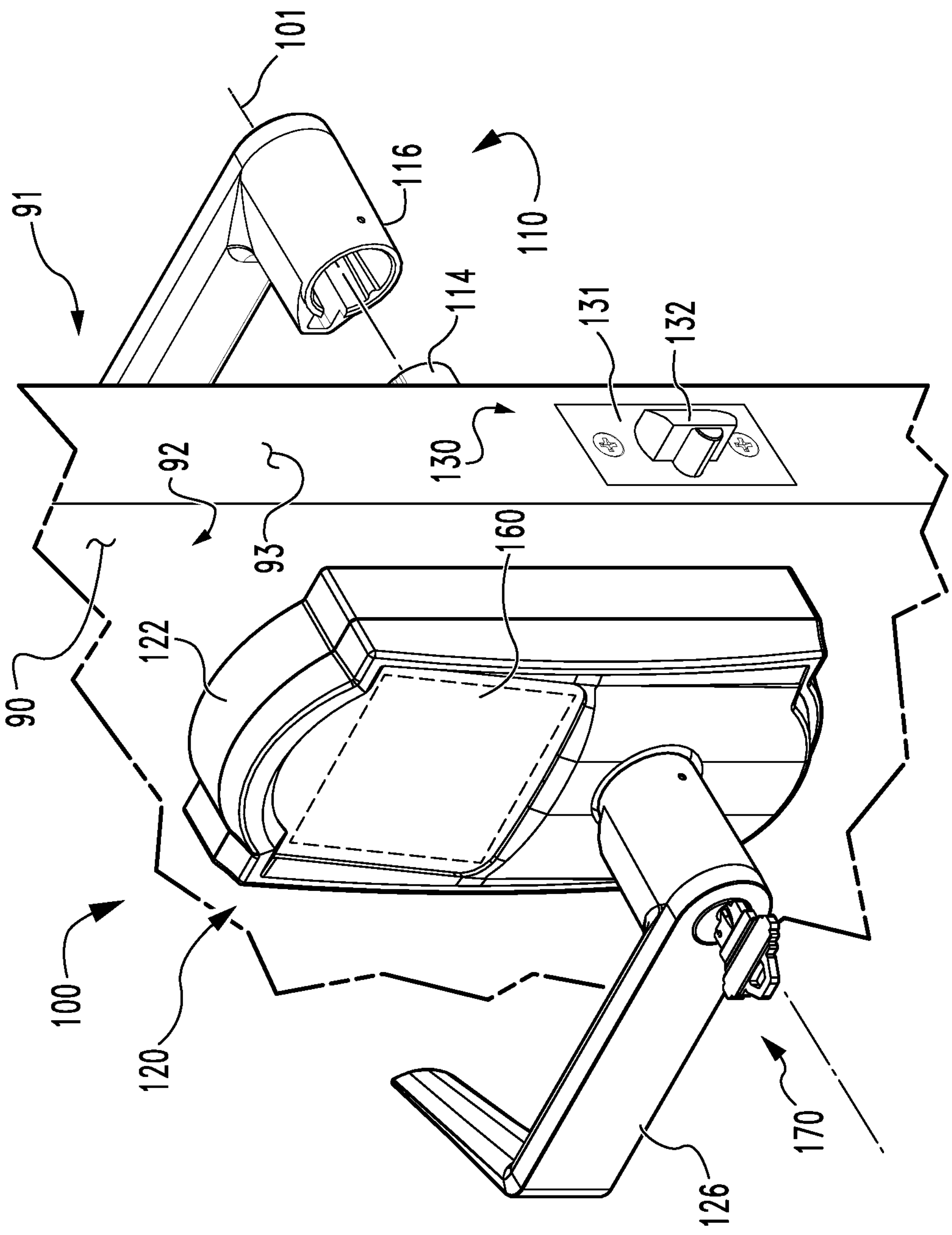
FIG. 1 is an exploded assembly view of a lockset including an outside trim assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required.

Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is door 90 having installed thereon a lockset 100 according to certain embodiments. The door 90 generally includes an inner or egress side 91, an outer or non-egress side 92 opposite the egress side 91, and a free edge 93 extending between and connecting the egress side 91 and the non-egress side 92. The lockset 100 generally includes an inside trim assembly 110 installed to the egress side 91, an outside trim assembly 120 installed to the non-egress side 92, and a latch mechanism 130 installed within the door 90 and operable to extend beyond the free edge 93. The outside trim assembly 120 includes a latch spindle 140 (FIG. 2) connected with the inside trim assembly 110 and the latch mechanism 130, and the lockset 100 further includes a control assembly 150 (FIG. 3) in communication with one or more electronic components of the lockset 100. In certain embodiments, the outside trim assembly 120 may further include a credential reader 160.

The inside trim assembly 110 generally includes an inside escutcheon, an inside drive spindle 114 rotatably mounted to the inside escutcheon for rotation about a longitudinal axis 101, and an inside handle 116 mounted to the inside drive spindle 114 for joint rotation therewith. The inside drive spindle 114 is operably connected with the latch mechanism 130 via the latch spindle 140 such that the inside handle 116 is operable to actuate the latch mechanism 130 by rotating the latch spindle 140. In certain embodiments, the inside trim assembly 110 may comprise at least a portion of the control assembly 150. In the illustrated form, the inside handle 116 is provided in the form of a lever handle. In other embodiments, the inside handle 116 may be provided in the form of a knob handle.

Figure 2:
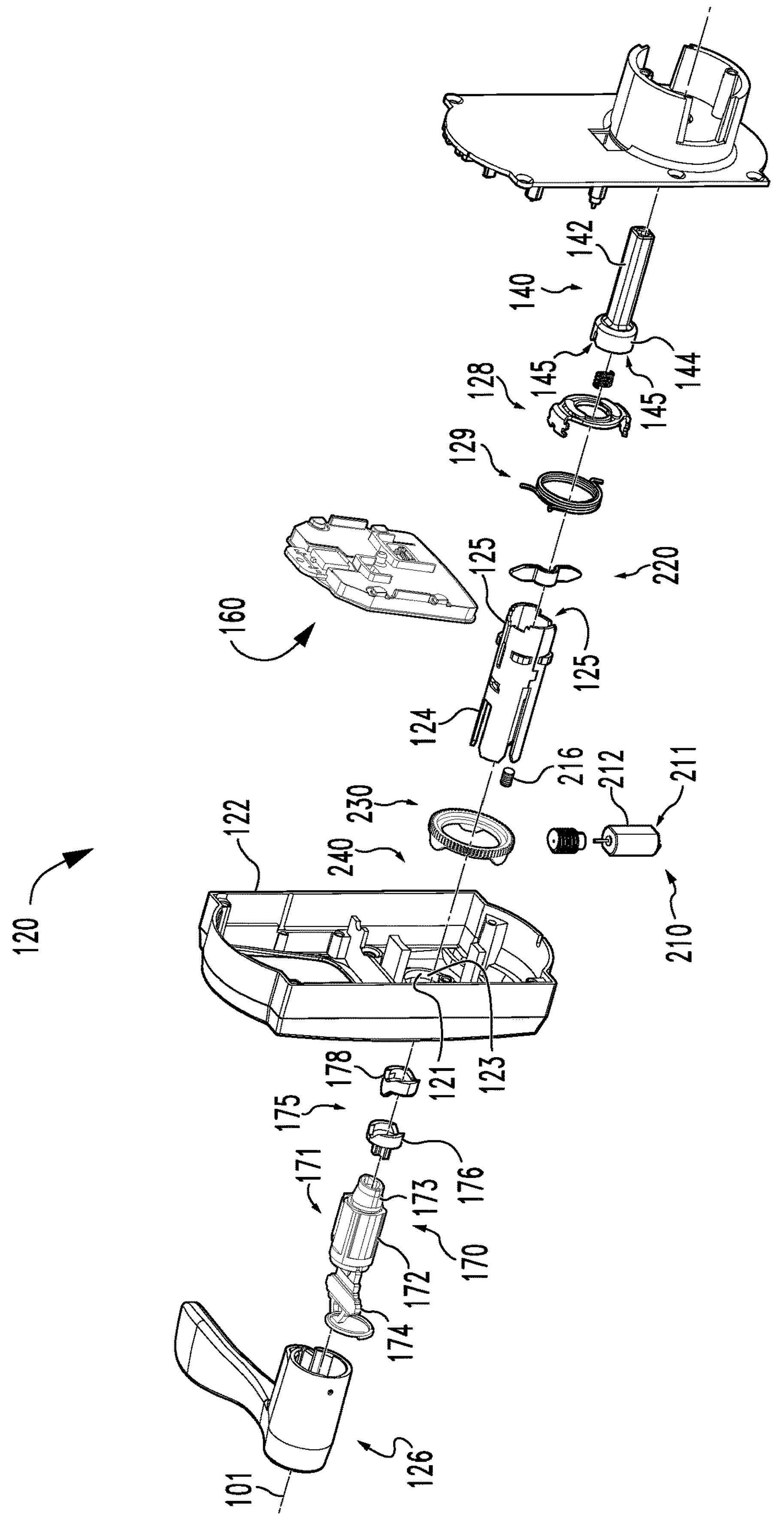
FIG. 2 is an exploded assembly view of the outside trim illustrated in FIG. 1.

With additional reference to FIG. 2, the outside trim assembly 120 generally includes an outside escutcheon 122, an outside drive spindle 124 rotatably mounted to the outside escutcheon 122, and an outside handle 126 mounted to the outside drive spindle 124. In the illustrated form, the outside trim assembly 120 further includes the latch spindle 140 and a lock cylinder assembly 170 mounted in the outside drive spindle 124 and the outside handle 126. As described herein, the outside trim assembly 120 further includes a lock mechanism 200 operable to selectively couple the outside drive spindle 124 with the latch spindle 140.

The outside escutcheon 122 includes a collar 123 defining an opening 121 through which the outside drive spindle 124 extends along the longitudinal axis 101. The longitudinal axis 101 extends along and defines a proximal direction (generally to the left in FIG. 2) and an opposite distal direction (generally to the right in FIG. 2). The outside drive spindle 124 includes at least one longitudinally-extending slot 125 through which the outside drive spindle 124 is selectively engaged with the latch spindle 140 via the lock mechanism 200, and in the illustrated form includes a pair of diametrically opposite slots 125. A spring cage 128 is mounted to a distal end portion of the drive spindle 124, and a torsion spring 129 is engaged between the spring cage 128 and the escutcheon 122 to rotationally bias the outside drive spindle 124 toward a home position. In the illustrated form, the outside handle 126 is provided in the form of a lever handle. In other embodiments, the outside handle 126 may be provided in the form of a knob handle.

The latch mechanism 130 generally includes a housing 131 and a latchbolt 132 movably mounted to the housing 131 for movement between an extended position and a retracted position. When the door 90 is closed and the latchbolt 132 is in its extended position, the latch mechanism 130 latches the door 90 in its closed position. When the latch mechanism 130 is actuated, the latchbolt 132 moves to its retracted position to permit opening of the door 90. As described herein, the inside handle 116 is operable to actuate the latch mechanism 130, and the outside handle 126 is selectively operable to actuate the latch mechanism 130 based upon the locking/unlocking state of the lock mechanism 200.

The latch spindle 140 is engaged with the inside drive spindle 114 such that the inside handle 116 is operable to rotate the latch spindle 140, and is engaged with the latch mechanism 130 such that rotation of the latch spindle 140 from a home position to a rotated or actuated position actuates the latch mechanism 130 to retract the latchbolt 132. In the illustrated form, rotation of the latch spindle 140 in each and either direction from the home position actuates the latch mechanism 130. Such actuation of a latch mechanism by rotation of a latch spindle is known in the art, and need not be described in further detail herein.

The latch spindle 140 generally includes a stem 142 and a cup 144 that is formed on a proximal end of the stem 142 such that the stem 142 extends distally from the cup 144. The cup 144 is rotatably seated in the outside drive spindle 124, and the stem 142 extends through the latch mechanism 130 and into engagement with the inside drive spindle 114. For example, the inside drive spindle 114 may include a non-circular opening that matches the non-circular geometry of the stem 142 such that the latch spindle 140 is rotationally coupled with the inside drive spindle 114. The cup 144 includes at least one longitudinal slot 145 through which the latch spindle 140 is selectively engaged with the outside drive spindle 124 via the lock mechanism 200, and in the illustrated form includes a pair of diametrically opposite slots 145.

Figure 3:
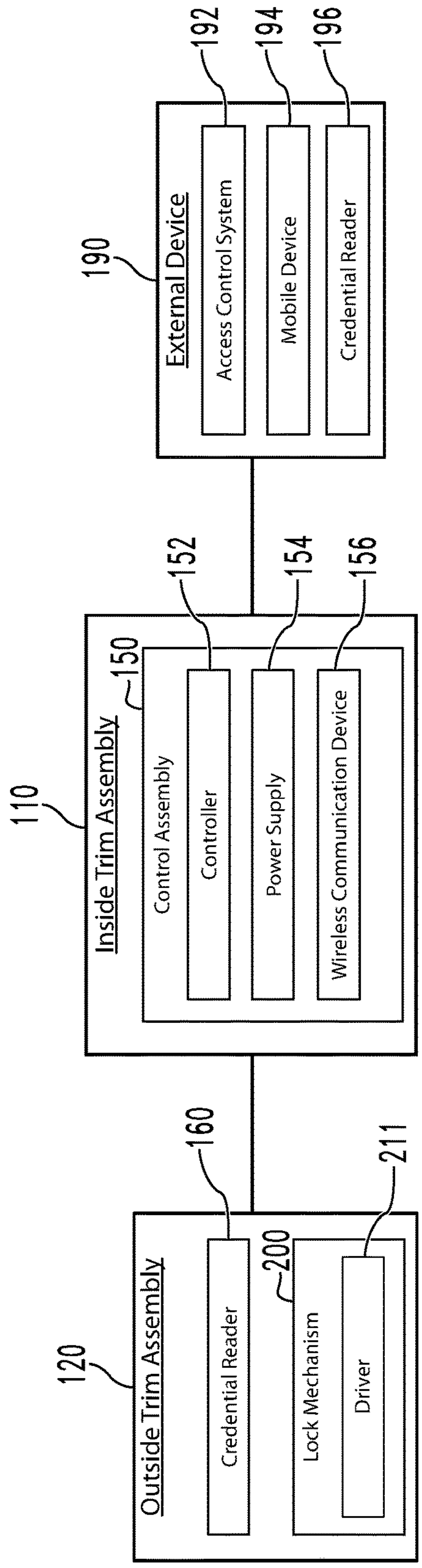
FIG. 3 is a schematic block diagram of the lockset illustrated in FIG. 1.

With additional reference to FIG. 3, the control assembly 150 is in communication with the lock mechanism 200, and may further be in communication with one or more of the credential reader 160 or an external device 190. In the illustrated form, the control assembly 150 is positioned at least partially in the inside escutcheon such that the inside trim assembly 110 includes at least a portion of the control assembly 150. The illustrated control assembly 150 includes a controller 152, and may further include a power supply 154 and/or a wireless communication device 156 that facilitates communication wireless communication with an external device 190, such as an access control system 192, a mobile device 194, or an external credential reader 196. It is also contemplated that the control assembly 150 may be in wired communication with an external device 190. In certain embodiments, the control assembly 150 may be provided as a standalone control assembly that does not communicate with an external device 190 during normal operation of the trim assembly 120.

The control assembly 150 is configured to control the lock mechanism 200 to move between its locking and unlocking states. For example, the control assembly 150 may transmit to the lock mechanism 200 a locking signal that causes a driver 211 to operate in a locking direction, thereby setting the lock mechanism 200 to the locking state as described below. The control assembly 150 may transmit to the driver 211 an unlocking signal that causes the driver 211 to operate in an unlocking direction, thereby setting the lock mechanism 200 to the unlocking state as described below. In certain embodiments, the control assembly 150 may selectively transmit the locking and/or unlocking signals based upon information received from the credential reader 160. In certain embodiments, the control assembly 150 may selectively transmit the locking and/or unlocking signals based upon information received from the external device 190.

In embodiments in which the outside trim assembly 120 includes the credential reader 160, the credential reader 160 may be mounted to the outside escutcheon 122. The credential reader 160 is configured to receive a credential input from a user and to transmit to the control assembly 150 credential information relating to the credential input. In certain embodiments, the credential reader 160 may comprise one or more of the following: a keypad operable to receive credential input in the form of an input code; a card reader operable to receive credential input from a card; a fob reader operable to receive credential input from a fob; a mobile device reader operable to receive credential input from a mobile device 194; a biometric credential reader operable to scan or otherwise receive a biometric credential (e.g., a fingerprint scan, an iris scan, or a retina scan). It is also contemplated that the credential reader 160 may take another form, or may be omitted from the outside trim assembly 120. Moreover, the external credential reader 196 may be provided as one or more of the above-described forms of credential reader, and/or may take another form.

Figure 4:
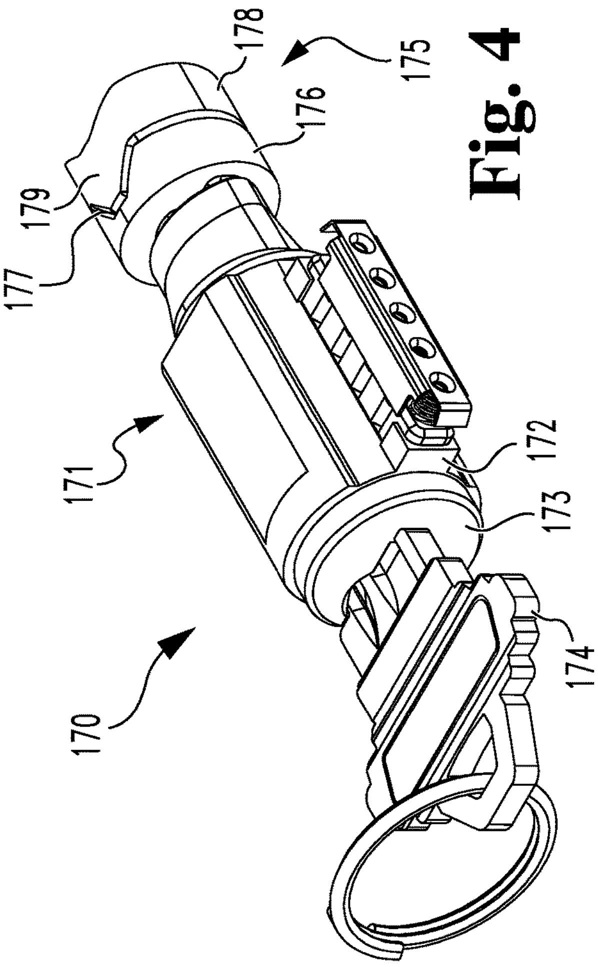
FIG. 4 is a perspective view of a lock cylinder assembly according to certain embodiments.

With additional reference to FIG. 4, the lock cylinder assembly 170 is mounted in the outside drive spindle 124 and the outside handle 126. The lock cylinder assembly 170 generally includes a lock cylinder 171 and a cam mechanism 175. As is typical of lock cylinders, the lock cylinder 171 generally includes a shell 172, a plug 173 rotatably mounted in the shell 172, and a tumbler assembly configured to selectively prevent rotation of the plug 173 relative to the shell 172. The tumbler assembly is biased toward a locking state in which the tumbler assembly prevents rotation of the plug 173 relative to the shell 172. Upon insertion of a properly cut key 174, the tumbler assembly moves to an unlocking state, in which the plug 173 is rotatable relative to the shell 172.

The cam mechanism 175 includes a driving cam 176 that is rotationally coupled with the plug 173, and a driven cam 178 that is engaged with the driving cam 176 and is slidable in the longitudinal direction. The driving cam 176 includes a first cam surface 177, and the driven cam 178 includes a second cam surface 179 engaged with the first cam surface 177. The cam surfaces 177, 179 are configured such that relative rotation of the driving cam 176 and the driven cam 178 causes relative longitudinal movement of the driving cam 176 and the driven cam 178. More particularly, rotation of the driving cam 178 from a home position to a rotated position (e.g., by operation of the lock cylinder 171) longitudinally drives the driven cam 178 from a proximal position to a distal position. As described herein, such movement of the driven cam 178 from its proximal position to its distal position is operable to transition the lockset 100 from a locked state to an unlocked state.

The lock mechanism 200 has a locking state corresponding to the locked state of the lockset 100 and an unlocking state corresponding to the unlocked state of the lockset 100. The lock mechanism 200 includes a drive assembly 210 operable to transition the lock mechanism 200 between its locking state and its unlocking state, a lock control lug 220 operable to selectively couple the outside drive spindle 124 with the latch spindle 140, a lock gear 230 operable to move the lock control lug 220 between a decoupling or locking position and a coupling or unlocking position when rotated by the drive assembly 210, and a cam mechanism 240 configured to drive the lock gear 230 from a proximal position to a distal position as the lock gear 230 rotates from a first rotational position to a second rotational position.

In the illustrated form, the lock gear 230 is provided in the form of a ring gear 230 through which the outside drive spindle 124 extends. It is also contemplated that the lock gear 230 may be provided in another form, such as one that does not comprise a central opening through which the outside drive spindle 124 extends. As described herein, the drive assembly 210 is operable to rotate the ring gear 230 between the first rotational position and the second rotational position, the cam mechanism 240 is configured to drive the ring gear 230 from the proximal position to the distal position as the ring gear 230 rotates from the first rotational position to the second rotational position, and the ring gear 230 is configured to drive the lock control lug 220 from its locking position to its unlocking position as the ring gear 230 travels from its proximal position to its distal position.

Figure 5:
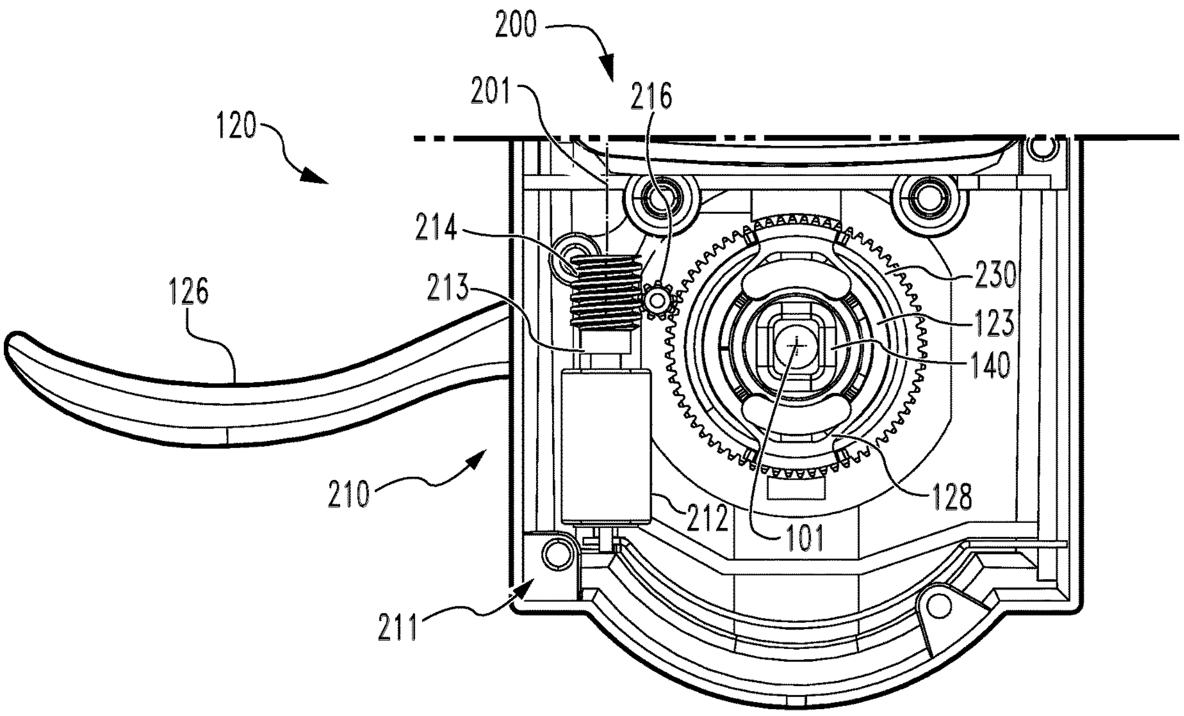
FIG. 5 is a rear plan view of the outside trim assembly illustrated in FIGS. 1 and 2.

With additional reference to FIG. 5, the drive assembly 210 is operable to rotate the ring gear 230 between its first and second rotational positions under control of the control assembly 150. The drive assembly 210 includes a driver 211 that rotates the ring gear 230 between its first and second rotational positions in response to receiving locking and unlocking signals from the control assembly 150. In the illustrated form, the driver 211 is provided in the form of a rotary motor 212 operable to rotate a motor shaft 213 to thereby rotate the ring gear 230 between its first and second rotational positions. More particularly, a worm 214 is coupled with the motor shaft 213 such that the worm 214 rotates with the motor shaft 213 about a second axis 201 transverse to the longitudinal axis 101. The worm 214 is engaged with the ring gear 230 such that rotation of the worm 214 causes a corresponding rotation of the ring gear 230 about the longitudinal axis 101. In the illustrated form, the worm 214 is engaged with the ring gear 230 via at least one intermediate gear, such as a longitudinally-extending pinion 216. As described herein, the pinion 216 extends in the longitudinal direction and maintains engagement between the worm 214 and the ring gear 230 as the ring gear 230 shifts between its proximal position and its distal position.

Figure 6:
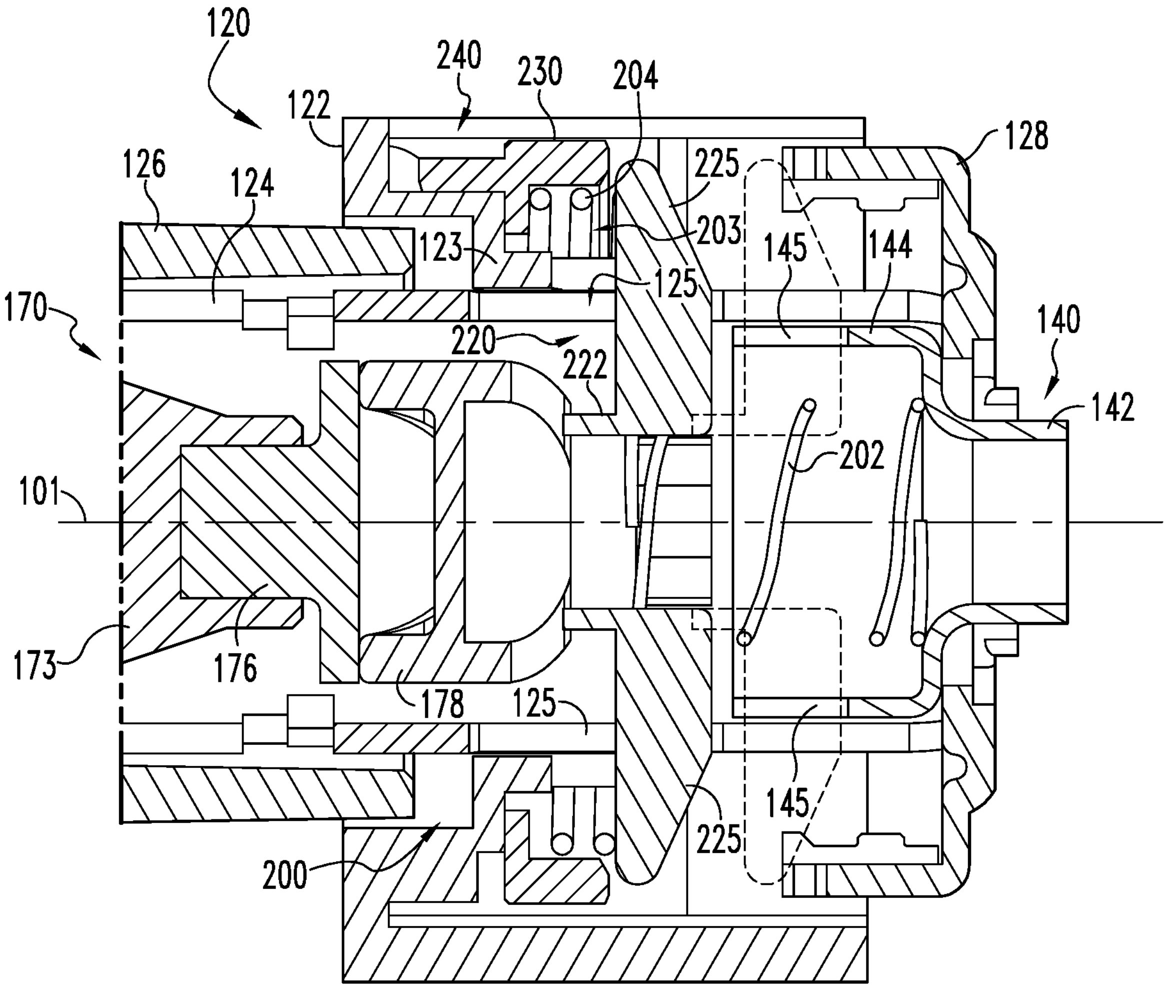
FIG. 6 is a cross-sectional view of a portion of a lock mechanism according to certain embodiments.

With additional reference to FIG. 6, the lock control lug 220 is seated in the outside drive spindle 124, and generally includes an arcuate body portion 222 and a pair of arms 225 extending from diametrically opposite sides of the body portion 222. The arms 225 extend through the longitudinal slots 125 in the drive spindle 124 such that the lock control lug 220 is rotationally coupled with the drive spindle 124. When the latch spindle 140 is in its home position, the latch spindle slots 145 are aligned with the drive spindle slots 125 such that the lock control lug 220 is movable from its proximal locking position (illustrated in solid) to its distal unlocking position (illustrated in phantom). A first spring 202 is seated in the cup 144 and engaged with the lock control lug 220 such that the first spring 202 biases the lock control lug 220 toward its proximal locking position.

With the lock control lug 220 in its proximal, decoupling, or locking position, the arms 225 are received in the drive spindle slots 125, but are removed from the latch spindle slots 145. As a result, the outside drive spindle 124 is rotationally decoupled from the latch spindle 140, and the outside handle 126 is inoperable to actuate the latch mechanism 130. Thus, the proximal locking position of the lock control lug 220 corresponds to a locking state of the lock mechanism 200 and a locked state of the lockset 100, in which the outside handle 126 is inoperable to rotate the latch spindle 140 to actuate the latch mechanism 130.

In certain forms, the arms 225 may extend into a pair of slots formed by the escutcheon 122 when the lock control lug 220 is in its locking position. In such forms, the lock control lug 220 in its locking position rotationally couples the outside drive spindle 124 with the escutcheon 122, thereby preventing rotation of the handle 126 and providing a stationary locked condition. In the illustrated form, however, the escutcheon 122 lacks such slots, and the outside drive spindle 124 remains free to rotate through its normal rotational range when the lock control lug 220 is in its locking position. This provides a freewheeling locked condition, in which the handle 126 remains free to rotate without such rotation actuating the latch mechanism 130.

As noted above, when the latch spindle 140 is in its home position, the latch spindle slots 145 are aligned with the drive spindle slots 125 such that the lock control lug 220 is able to move from its proximal locking position to its distal unlocking position. In the distal, coupling, or unlocking position, the arms 225 are at least partially received in the latch spindle slots 145, thereby causing the lock control lug 220 to rotationally couple the outside drive spindle 124 with the latch spindle 140. As a result, rotation of the drive spindle 124 is transmitted to the latch spindle 140 via the lock control lug 220, and the outside handle 126 is operable to actuate the latch mechanism 130. Thus, the distal unlocking position of the lock control lug 220 corresponds to an unlocking state of the lock mechanism 200 and an unlocked state of the lockset 100, in which the outside handle 126 is operable to rotate the latch spindle 140 to actuate the latch mechanism 130.

As should be appreciated from the foregoing, movement of the lock control lug 220 between its locking position and its unlocking position transitions the lock mechanism 200 between its locking state and its unlocking state, thereby transitioning the lockset 100 between its locked state and its unlocked state. As described in further detail below, the lock control lug 220 is capable of being electromechanically moved between its locking position and its unlocking position by operation of the drive assembly 210, for example under control of the control assembly 150.

In the illustrated form, the lock control lug 220 is further capable of being mechanically driven between its locking position and its unlocking position by operation of the lock cylinder assembly 170. As noted above, actuation of the lock cylinder 171 (e.g., by insertion and rotation of an appropriate key) drives the driven cam 178 from its proximal position to its distal position. The driven cam 178 is operable to engage the lock control lug 220 such that the driven cam 178 drives the lock control lug 220 from its proximal locking position to its distal unlocking position as the driven cam 178 is driven from its proximal position to its distal position. Thus, the lock cylinder assembly 170 is operable to mechanically transition the lockset 100 to its unlocked state. When the driving cam 176 subsequently returns to its home position (e.g., upon return of the plug 173 to its home position to enable removal of the key 174), the first spring 202 proximally urges the lock control lug 220 toward its locking position, thereby returning the driven cam 178 to its proximal position.

Figure 7:
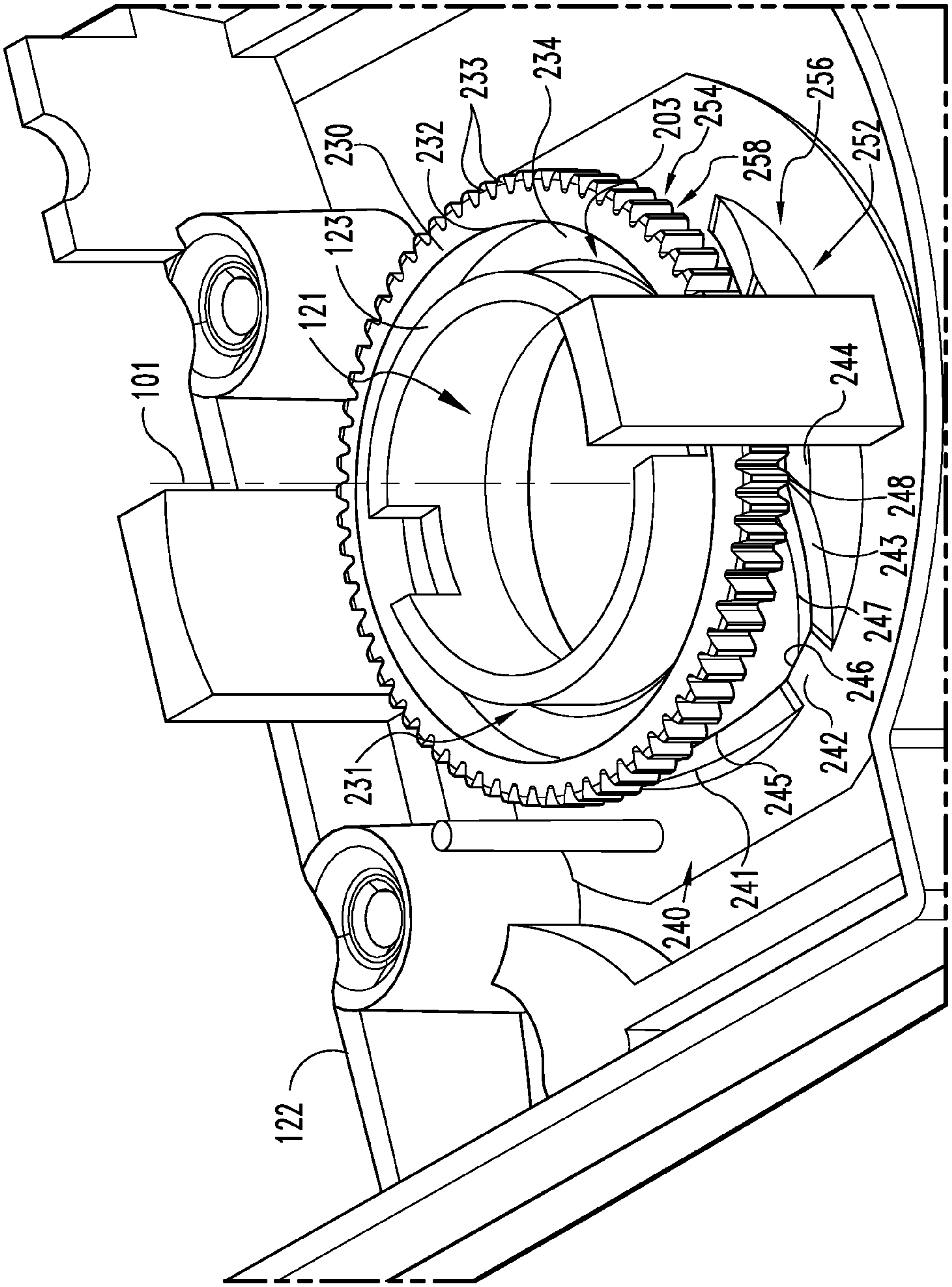
FIG. 7 is a perspective view of a portion of the outside trim assembly illustrated in FIG. 1.

With additional reference to FIG. 7, the illustrated lock gear is provided in the form of a ring gear 230, which generally includes an annular wall 232 having a plurality of gear teeth 233 formed on a radially-outer side thereof. The ring gear 230 further includes a spring seat 234 that projects radially inward from the annular wall 232 and defines a circular central opening 231 of the ring gear 230. As described herein, the ring gear 230 further includes a cam 245 of the cam mechanism 240. The ring gear 230 is seated on the collar 123 such that the collar 123 projects through the central opening 231 and rotatably supports the ring gear 230 for movement along the longitudinal axis 101 between its proximal position and its distal position. An annular channel 203 is defined between the annular wall 232 and the collar 123, and a second spring 204 is seated in the annular channel 203. As described herein, the second spring 204 is engaged between the lock control lug 220 and the ring gear 230 and aids in driving the lock control lug 220 from its locking position to its unlocking position.

The cam mechanism 240 is configured to cause longitudinal movement of the ring gear 230 along the longitudinal axis 101 in response to rotation of the ring gear 230 about the longitudinal axis 101, and generally includes a first cam 241 and a second cam 245 engaged with the first cam 241. In the illustrated form, the escutcheon 122 defines or otherwise includes the first cam 241, and the ring gear 230 defines or otherwise includes the second cam 245. As such, the first cam 241 and the second cam 245 may alternatively be referred to herein as the escutcheon cam 241 and the ring gear cam 245, respectively.

The cam mechanism 240 may additionally be considered to include a longitudinally fixed cam 252 having a fixed position relative to the escutcheon 122, a longitudinally movable cam 254 movable relative to the escutcheon 122 between a first longitudinal position and a second longitudinal position, a rotationally fixed cam 256 having a fixed rotational position relative to the escutcheon 122, and a rotatable cam 258 rotatable relative to the escutcheon 122 between a first rotational position and a second rotational position. Moreover, one of the longitudinally fixed cam 252 or the longitudinally movable cam 254 comprises the rotationally fixed cam 256, and the other of the longitudinally fixed cam 252 or the longitudinally movable cam 254 comprises the rotatable cam 258. Additionally, the drive assembly 210 is operable to rotate the rotatable cam 256 between its first rotational position and its second rotational position, and the cam mechanism 240 is configured to drive the longitudinally movable cam 254 from its first longitudinal position to its second longitudinal position as the rotatable cam 256 rotates from its first rotational position to its second rotational position. In the illustrated form, the escutcheon 122 comprises the first cam 241, which comprises the longitudinally fixed cam 252 and the rotationally fixed cam 256, while the ring gear 230 comprises the second cam 245, which comprises the longitudinally movable cam 254 and the rotatable cam 258. As described herein, other combinations are contemplated for the cams 252, 254, 256, 258.

The first or escutcheon cam 241 includes a first proximal landing 242, a first distal landing 244, and a first ramp 243 extending between and connecting the first landings 242, 244. The second or ring gear cam 245 similarly includes a second proximal landing 246, a second distal landing 248, and a second ramp 247 extending between and connecting the second landings 246, 248. In the illustrated form, the first cam 241 includes a plurality of first proximal landings 242, a plurality of first distal landings 244, and a plurality of first ramps 243 connecting each of the first proximal landings 242 with a corresponding pair of first distal landings 244. Similarly, the second cam 245 includes a plurality of second proximal landings 246, a plurality of second distal landings 248, and a plurality of second ramps 247 connecting each of the second proximal landings 246 with a corresponding pair of second distal landings 248.

In the illustrated form, each of the first proximal landings 242, each of the first distal landings 244, and each of the second distal landings 248 comprises a flat surface or plateau, and each of the second proximal landings 246 comprises an apex or peak. It is also contemplated that other combinations of plateaus and peaks may be utilized. As one example, one or more of the second proximal landings 246 may be provided as a flat surface or plateau, and one or more of the first distal landings 244 may be provided as an apex or peak.

As noted above, the drive assembly 210 is operable to rotate the ring gear 230 between a first rotational position and a second rotational position, and the cam mechanism 240 is configured to drive the ring gear 230 (which in the illustrated form defines the longitudinally movable cam 254 and the rotatable cam 258) from a first longitudinal position to a second longitudinal position as the ring gear 230 rotates from the first rotational position to the second rotational position. In the illustrated form, the first longitudinal position is a proximal position and the second longitudinal position is a distal position. It is also contemplated that this orientation may be reversed such that the first longitudinal position is a distal position and the second longitudinal position is a proximal position.

In FIG. 6, the ring gear 230 is illustrated in its locking position, which comprises the first rotational position of the rotatable cam 258 and the first longitudinal position of the longitudinally movable cam 254. In this state, one or more of the first proximal landings 242 is engaged with a corresponding one of the second proximal landings 246 and/or one or more of the first distal landings 244 is engaged with a corresponding one of the second distal landings 248. As described herein, the ring gear 230 is retained in this position by the first spring 202, which is engaged with the ring gear 230 via the lock control lug 220 and the second spring 204 to thereby proximally urge the ring gear 230 toward its proximal or first longitudinal position.

During rotation of the ring gear 230 from its first rotational position to its second rotational position, the cam mechanism 240 drives the ring gear 230 from its proximal position to its distal position. More particularly, the ramps 243, 247 engage one another to urge the ring gear 230 to its distal position against the biasing force of the first spring 202 until one or more of the first distal landings 244 is engaged with a corresponding one of the second proximal landings 246. This state defines the unlocking position of the ring gear 230, which comprises the second rotational position and the second longitudinal position. With the ring gear 230 in its unlocking position, the engaged landings 244, 246 retain the ring gear 230 in its distal or second longitudinal position against the proximal urging of the first spring 202.

Figure 8:
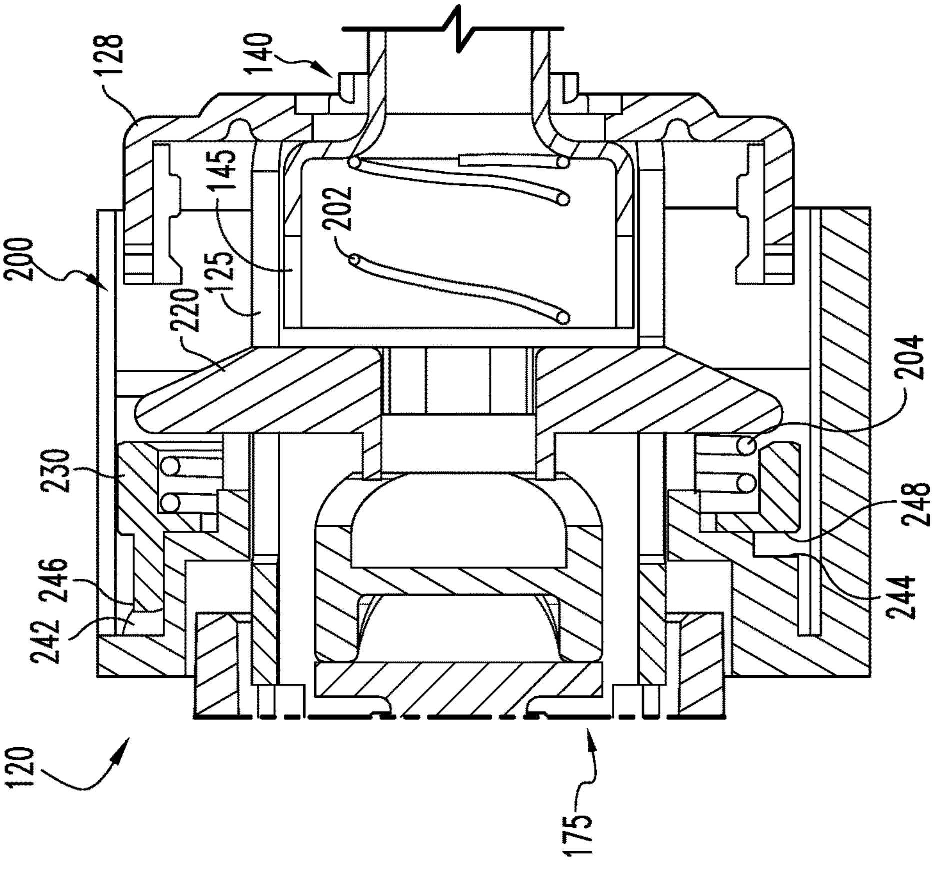
FIG. 8 is a cross-sectional illustration of a portion of a lock mechanism in a locking state.

With additional reference to FIG. 8, illustrated therein is the lock mechanism 200 in its locking state, in which each of the lock control lug 220 and the ring gear 230 is in the locking position thereof. In this state, the proximal landings 242, 246 are positioned adjacent one another and/or are engaged with one another, and the distal landings 244, 248 are positioned adjacent one another and/or are engaged with one another. The first spring 202 biases the lock control lug 220 toward its proximal locking position, and the lock control lug 220 is engaged with the ring gear 230 via the second spring 204 such that the first spring 202 also biases the ring gear 230 toward its proximal position. With the lock control lug 220 in its locking position, the lock control lug 220 is removed from the drive spindle slots 145 such that the drive spindle 124 is rotationally decoupled from the latch spindle 140 as described above.

The lock mechanism 200 can be transitioned from its locking state (FIG. 8) to its unlocking state (FIG. 9) by the drive assembly 210, for example in response to receiving an unlocking signal at the driver 211. Such an unlocking signal causes the driver 211 to rotate the ring gear 230 from its first rotational position to its second rotational position, thereby causing the cam mechanism 240 to drive the ring gear 230 from its proximal position to its distal position as described above. Thus, the drive assembly 210 and the cam mechanism 240 cooperate to drive the ring gear 230 from its locking position to its unlocking position in response to the unlocking signal, thereby moving the lock control lug 220 to its distal or locking position and compressing the first spring 202.

Figure 9:
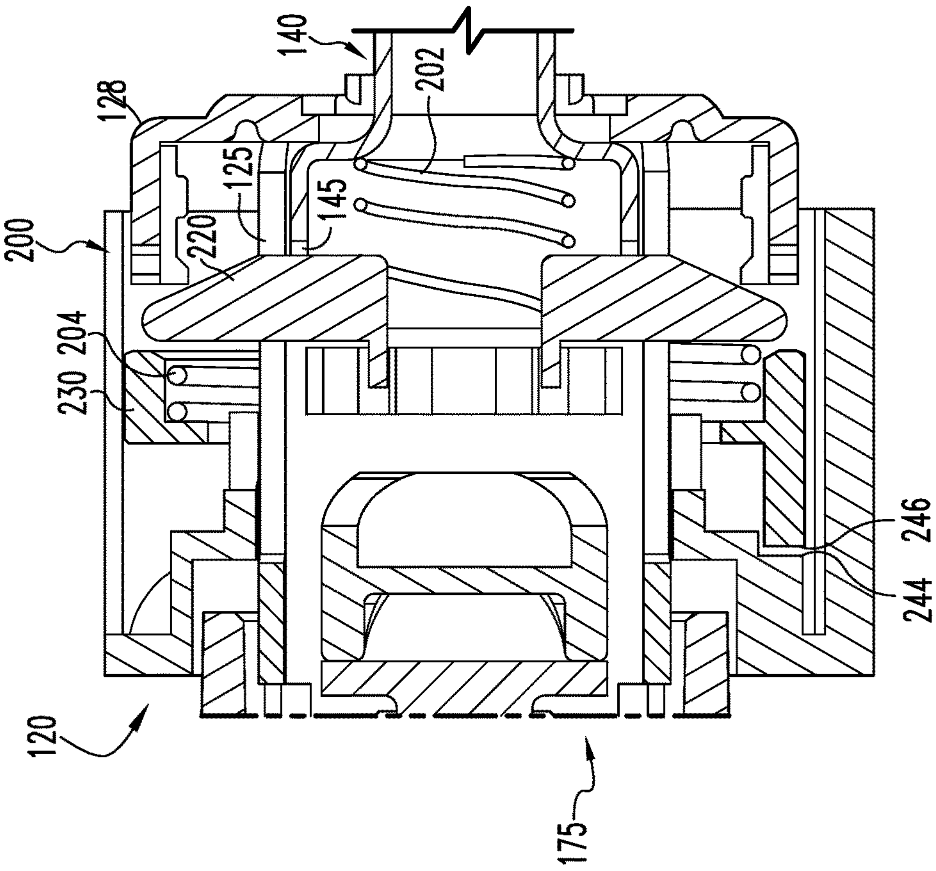
FIG. 9 is a cross-sectional illustration of a portion of a lock mechanism in an unlocking state.

With additional reference to FIG. 9, illustrated therein is the lock mechanism 200 in its unlocking state, in which each of the lock control lug 220 and the ring gear 230 is the unlocking position thereof. In this state, the ring gear proximal landing 246 is engaged with the escutcheon distal landing 244 to hold the ring gear 230 in its distal position against the proximal biasing force of the first spring 202. Movement of the ring gear 230 from its locking position to its unlocking position causes the second spring 204 to urge the lock control lug 220 from its locking position to its unlocking position, in which the lock control lug 220 is seated in both the drive spindle slots 125 and the latch spindle slots 145. As a result, the drive spindle 124 is rotationally coupled with the latch spindle 140 as described above.

In FIGS. 8 and 9, the spindles 124, 140 are illustrated in an aligned state, in which the drive spindle slots 125 are aligned with the latch spindle slots 145. In this state, the lock control lug 220 is free to move from its locking position to its unlocking position. It may be the case, however, that the spindles 124, 140 may be in a misaligned state, in which the lock control lug 220 is blocked from moving from its locking position to its unlocking position.

Figure 10:
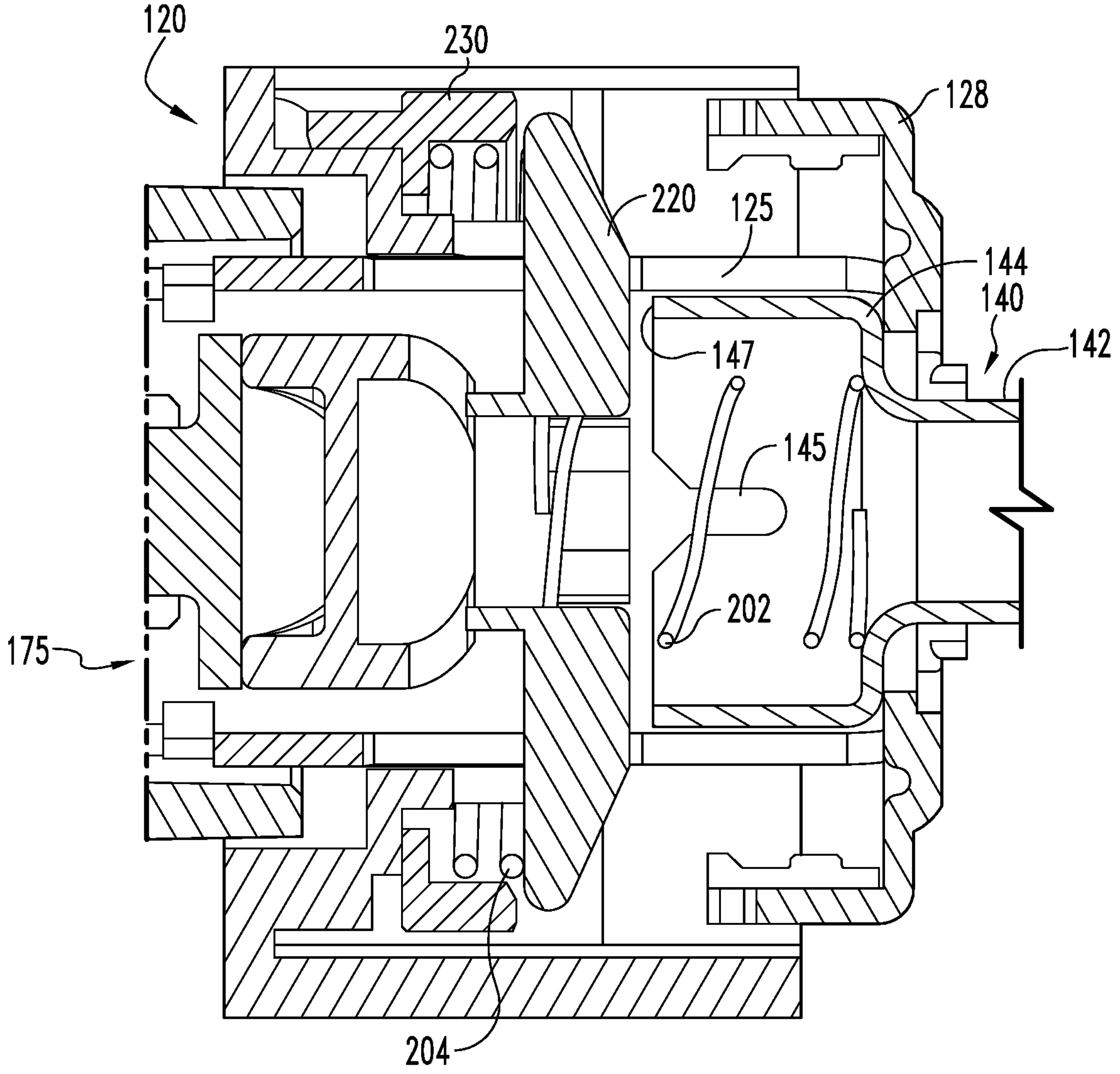
FIG. 10 is a cross-sectional illustration of a portion of a lock mechanism in a locking state, in which the spindles of the trim assembly are in a misaligned state.

With additional reference to FIG. 10, illustrated therein is a state in which the lock mechanism 200 is in its locking state, and the spindles 124, 140 are in a misaligned state. The spindles 124, 140 may adopt this misaligned state, for example, when the drive spindle 124 has been rotated from its home position (e.g., by the outside handle 126), or when the latch spindle 140 has been rotated from its home position (e.g., by the inside handle 116). With the spindles 124, 140 in the misaligned state, the drive spindle slots 125 are misaligned with the latch spindle slots 145. As a result, the lock control lug 220 is blocked from moving to its unlocking position by the proximal end 147 of the cup 144. Should the spindles 124, 140 be in the misaligned state, however, the ring gear 230 will nonetheless remain able to move from its proximal position to its distal position when the drive assembly 210 rotates the ring gear 230 from its first rotational position to its second rotational position. During such movement of the ring gear 230 from its locking position to its unlocking position, the second spring 204 will compress, thereby storing mechanical energy.

When the lock control lug 220 subsequently becomes free to move to its unlocking position (e.g., when the spindles 124, 140 return to the aligned state), the second spring 204 releases the stored mechanical energy and urges the lock control lug 220 toward its unlocking position. Those skilled in the art will readily appreciated that the distal urging of the second spring 204 is counteracted in part by the proximal urging of the first spring 202. However, the second spring 204 is provided as a heavier or stiffer spring, and the first spring is provided as a lighter or less stiff spring. In other words, a first stiffness of the first spring 202 is less than a second stiffness of the second spring 204. As a result, the second spring 204 is able to drive the lock control lug 220 toward its distal unlocking position against the proximal urging of the first spring 202 such that the lock mechanism 200 adopts its unlocking state when the spindles 124, 140 return to the aligned state.

In the illustrated form, the escutcheon 122 comprises the first cam 241, which defines the longitudinally fixed cam 252 and the rotationally fixed cam 256, and the ring gear 230 comprises the second cam 245, which defines the longitudinally movable cam 254 and the rotatable cam 258. It is also contemplated that other combinations of fixed and movable cams may be utilized. As one example, a first cam may not necessarily be defined by the escutcheon 122, and may be rotatable relative to the escutcheon 122 such that the drive assembly 210 is operable to rotate the rotatable first cam 258 between a first rotational position and a second rotational position. In such forms, a second cam may have a fixed rotational position relative to the escutcheon 122 and be longitudinally movable relative to the escutcheon 122 (i.e., may comprise the longitudinally movable cam 254 and the rotationally fixed cam 256) such that rotation of the first cam (including the longitudinally fixed cam 252 and the rotatable cam 258) from the first rotational position to the second rotational position causes a corresponding longitudinal movement of the second cam (including the longitudinally movable cam 254 and the rotationally fixed cam 256) from its first longitudinal position to its second longitudinal position, thereby urging the lock control lug 220 from its locking position to its unlocking position in a manner analogous to that described above.

Figure 11:
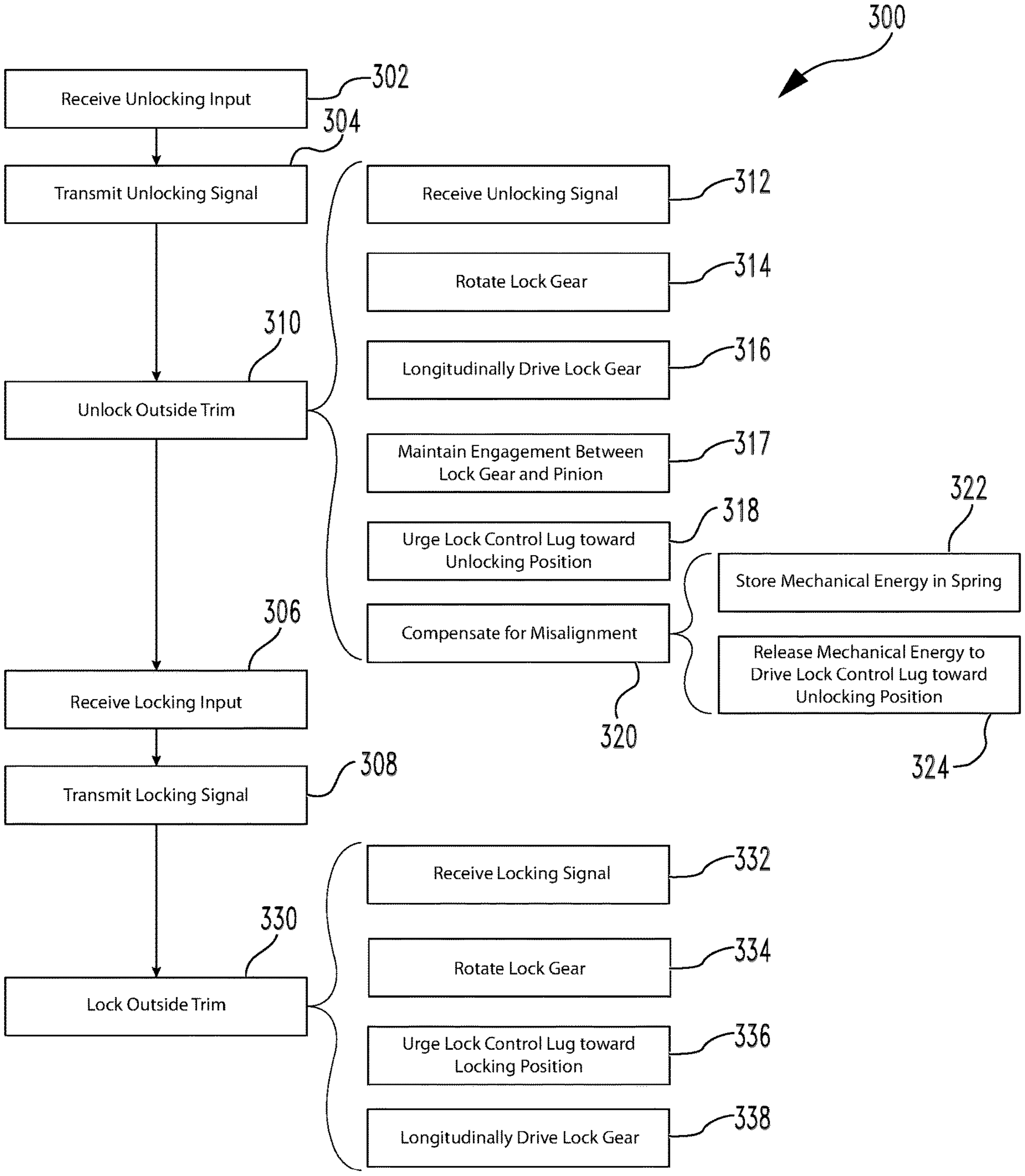
FIG. 11 is a schematic flow diagram of a process according to certain embodiments.

With additional reference to FIG. 11, illustrated therein is an exemplary process 300 that may be performed to unlock and/or lock a door lock apparatus, such as a lock set or a trim assembly. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 300 is described herein with specific reference to the lockset 100 and associated features illustrated in FIGS. 1-10, it is to be appreciated that the process 300 may be performed with locksets having additional or alternative features. For example, one or more of the blocks described with reference to the process 300 may be performed using the trim assembly 120, or may be performed using a trim assembly of another configuration.

The process 300 may begin with the outside trim assembly 120 in a locked condition, in which a lock mechanism 200 of the trim assembly 120 is in a locked state. The trim assembly 120 generally includes an escutcheon 122, a lock gear 230 mounted in the escutcheon 122 for rotation about a longitudinal axis 101, a drive spindle 124 rotatably mounted to the escutcheon 122, and a latch spindle 140 rotatably mounted to the escutcheon 122. In the illustrated form, the escutcheon 122 comprises a first cam 241, the lock gear 230 comprises a second cam 245, and the trim assembly 120 includes a cam mechanism 240 comprising the first cam 241 and the second cam 245. The trim assembly 120 further includes a lock control lug 220 having a locking position and an unlocking position. The drive spindle 124 is rotationally decoupled from the latch spindle 140 when the lock control lug 220 is in its locking position, and the drive spindle 124 is rotationally coupled with the latch spindle 140 when the lock control lug 220 is in its unlocking position.

The process 300 may initiate as a result of an unlocking input that is received in block 302. The unlocking input may be provided to the control assembly 150, for example by a credential reader 160 of the trim assembly 120, by an external device 190, or by a pushbutton or other electrical selector mounted to the inside trim assembly 110. The process 300 may include block 304, which generally involves transmitting an unlocking signal in response to receipt of the unlocking input. For example, in embodiments in which the unlocking input is received from a credential reader 160/196, block 304 may involve transmitting the unlocking signal from the control system 150 in response to presented credential information matching an authorized credential.

The process 300 may include an unlocking procedure 310, which generally involves unlocking the trim assembly 120 in response to the unlocking signal. As described herein, the unlocking procedure 310 generally involves receiving the unlocking signal, rotating the lock gear 230 from a first rotational position to a second rotational position, driving the lock gear 230 from a first longitudinal position to a second longitudinal position, and urging the lock control lug 220 from the locking position toward the unlocking position.

The unlocking procedure 310 includes block 312, which generally involves receiving, at a driver 211 of the lock mechanism 200, the unlocking signal. In the illustrated form, block 312 involves receiving the unlocking signal at the rotary motor 212, the output shaft 213 of which is rotationally coupled with a worm 214 such that the motor 212 is operable to rotate the worm 214 about a second axis 201 transverse to the longitudinal axis 101. As noted above, the worm 214 is engaged with the ring gear 230 such that rotation of the worm 214 about the second axis 201 causes a corresponding rotation of the ring gear 230 about the longitudinal axis 101. For example, the worm 214 may be engaged with the ring gear 230 via a longitudinally-extending pinion 216.

The unlocking procedure 310 includes block 314, which generally involves rotating the ring gear 230 about the longitudinal axis 101 from a first rotational position to a second rotational position. Block 314 may be performed by the driver 211 and in response to receiving the unlocking signal. Block 314 may, for example, involve rotating the worm 214 through a predetermined angle sufficient to drive the ring gear 230 from its first rotational position to its second rotational position.

The unlocking procedure 310 includes block 316, which generally involves longitudinally driving the ring gear 230 from a first longitudinal position to a second longitudinal position. Block 316 may be performed by the cam mechanism 240 and during rotation of the ring gear 230 from the first rotational position to the second rotational position. In the illustrated form, block 316 involves engaging the ramps 243, 247 with one another to drive the ring gear 230 from its proximal position to its distal position as the ring gear 230 rotates between its first rotational position and its second rotational position as described above. When the ring gear 230 reaches its locking position, which includes the second rotational position and the distal or second longitudinal position, the ring gear proximal landing 246 is engaged with the escutcheon distal landing 244 to hold the ring gear 230 in its distal position against the biasing force of the first spring 202.

The unlocking procedure 310 may further include block 317, which generally involves maintaining engagement between the ring gear 230 and the longitudinally-extending pinion gear 216 during movement of the ring gear 230 from the first longitudinal position to the second longitudinal position. For example, as the ring gear 230 travels along the longitudinal axis 101, the teeth 233 of the ring gear 230 may travel along the teeth of the pinion 216 while the ring gear teeth 233 remain engaged with the pinion teeth.

The unlocking procedure 310 includes block 318, which generally involves urging the lock control lug 220 from its locking position toward its unlocking position. Block 318 may be performed by the ring gear 230 and during movement of the ring gear 230 from the first longitudinal position to the second longitudinal position. In the illustrated form, block 318 involves the ring gear 230 urging the lock control lug 220 toward its unlocking position via the second spring 204.

The unlocking procedure 310 may further include a misalignment compensation procedure 320. The misalignment compensation procedure 320 may, for example, be performed when the drive spindle 124 and the latch spindle 140 are in the misaligned state (FIG. 10). As noted above, such a misaligned state may, for example, occur when the drive spindle 124 has been rotated from its home position (e.g., by the outside handle 126), and/or when the latch spindle 140 has been rotated from its home position (e.g., by the inside handle 116).

The misalignment compensation procedure 320 generally includes block 322, which generally involves storing mechanical energy in the second spring 204 as a result of movement of the ring gear 230 from the first longitudinal position to the second longitudinal position. More particularly, when the lock control lug 220 is blocked from moving to its unlocking position, movement of the ring gear 230 from its proximal position toward its distal position compresses the second spring 204, thereby storing mechanical energy in the second spring 204.

In response to return of the drive spindle 124 and the latch spindle 140 to the aligned state, the trim assembly 120 may perform block 324, which generally involves driving the lock control lug 220 to the locking position using the mechanical energy stored in the second spring 204. As noted above, the second spring 204 is stiffer than the first spring 202 such that the distal urging of the second spring 204 overcomes the proximal urging of the first spring 202, thereby driving the lock control lug 220 to its unlocking position when the spindles 124, 140 return to the aligned state.

In certain embodiments, the process 300 may include block 306, which generally involves receiving a locking input. In certain embodiments, the locking input may be generated by a timer of the control assembly 150, for example a predetermined time after transmission of the unlocking signal. In certain embodiments, the locking input may be generated by a pushbutton of the inside trim assembly 110. In certain embodiments, the locking input may be generated by the credential reader 160 and/or an external device 190. The process 300 may further include block 308, which generally involves transmitting a locking signal to the driver 211. Block 308 may, for example, be performed by the control assembly 150 in response to receiving and/or generating the locking input.

The process 300 may include a locking procedure 330, which generally involves transitioning the lock mechanism 200 from its unlocked state to its locked state. As described herein, the locking procedure 330 generally includes receiving the locking signal, rotating the ring gear 230, and urging the lock control lug 220 and the lock gear 230 proximally toward the locking positions thereof.

The locking procedure 330 may include block 332, which generally involves receiving the locking signal at the driver 211. In certain embodiments, the locking signal may be one that causes the motor 212 to rotate the worm 214 in an opposite direction as the worm 214 was rotated to unlock the trim assembly 120. In other embodiments, the locking signal may be one that causes the motor 212 to rotate the worm 214 in the same direction as the worm 214 was rotated to unlock the trim assembly 120.

The locking procedure 330 may include block 334, which generally involves rotating the ring gear 230 from the second rotational position. Block 334 may be performed by the driver 211 and in response to receiving the locking signal. In certain embodiments, such as those in which the locking signal causes the motor 212 to rotate the worm 214 in the opposite direction as the worm 214 was rotated to unlock the trim assembly 120, block 334 may involve returning the ring gear 230 to the first rotational position. In certain embodiments, such as those in which the locking signal causes the motor 212 to rotate the worm 214 in the same direction as the worm 214 was rotated to unlock the trim assembly 120, block 334 may involve rotating the ring gear 230 to a third rotational position in which the ring gear proximal landing 246 is aligned with a different one of the escutcheon proximal landings 242 than the escutcheon proximal landing 242 with which the ring gear proximal landing 246 was previously aligned. In either event, block 334 may involve rotating the ring gear 230 such that each ring gear proximal landing 246 is once again aligned with a corresponding escutcheon proximal landing 242.

The locking procedure 330 may include block 336, which generally involves urging the lock control lug 220 from the unlocking position toward the locking position, for example by the first spring 202. In the illustrated form, the urging of the first spring 202 is transmitted to the ring gear 230 (e.g., via the second spring 204), thereby urging the ring gear 230 from the second longitudinal position toward the first longitudinal position. As a result, in block 338, the ring gear 230 returns to the first longitudinal position as the ring gear 230 rotates from the second rotational position (e.g., toward the first rotational position or the third rotational position).

Figure 12:
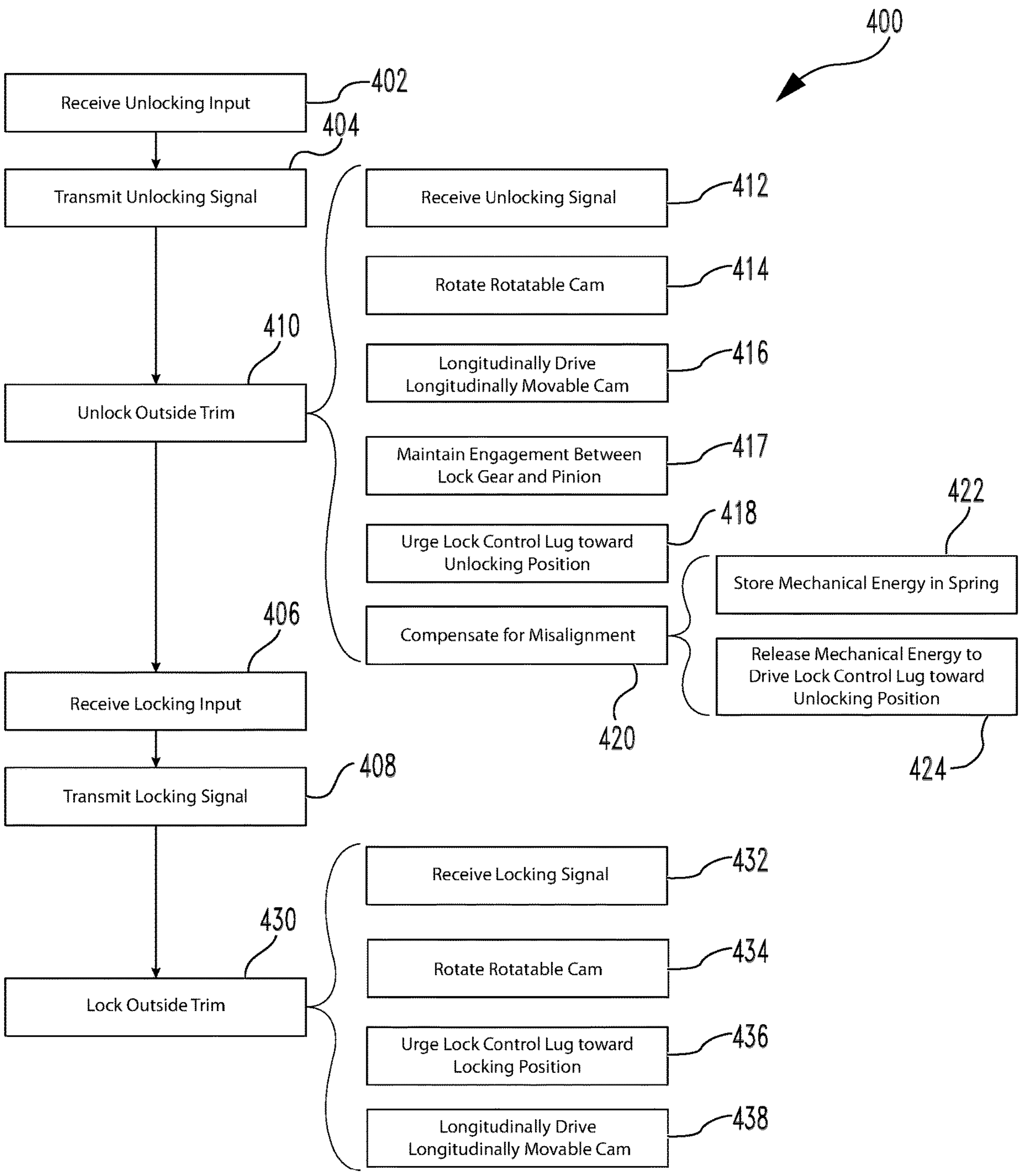
FIG. 12 is a schematic flow diagram of a process according to certain embodiments.

With additional reference to FIG. 12, illustrated therein is an exemplary process 400 that may be performed to unlock and/or lock a door lock apparatus, such as a lock set or a trim assembly. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 300 is described herein with specific reference to the lockset 100 and associated features illustrated in FIGS. 1-10, it is to be appreciated that the process 400 may be performed with locksets having additional or alternative features. For example, one or more of the blocks described with reference to the process 400 may be performed using the trim assembly 120, or may be performed using a trim assembly of another configuration.

The process 400 is substantially similar to the above-described process 300, and similar reference characters are used to indicate similar blocks. In the interest of conciseness, the following description of the process 400 focuses primarily on blocks and features that differ from those described above with reference to the process 300.

The process 400 may begin with the outside trim assembly 120 in a locked condition, in which a lock mechanism 200 of the trim assembly 120 is in a locked state. The trim assembly 120 generally includes an escutcheon 122, a rotatable cam 258 mounted in the escutcheon 122 for rotation about a longitudinal axis 101, a drive spindle 124 rotatably mounted to the escutcheon 122, and a latch spindle 140 rotatably mounted to the escutcheon 122. A cam mechanism 240 comprises a longitudinally fixed cam 252 and a longitudinally movable cam 254, one of which comprises a rotationally fixed cam 256 and the other of which comprises the rotatable cam 258, which is defined by a lock gear 230. The trim assembly 120 further includes a lock control lug 220 having a locking position and an unlocking position. The drive spindle 124 is rotationally decoupled from the latch spindle 140 when the lock control lug 220 is in its locking position, and the drive spindle 124 is rotationally coupled with the latch spindle 140 when the lock control lug 220 is in its unlocking position.

The process 400 may initiate as a result of an unlocking input that is received in block 402, and an unlocking signal may be transmitted in block 404 in response to receipt of the unlocking input, for example as described above with reference to blocks 302, 304.

The process 400 may include an unlocking procedure 410, which generally involves unlocking the trim assembly 120 in response to the unlocking signal. As described herein, the unlocking procedure 410 generally involves receiving the unlocking signal, rotating the lock gear 230 and the rotatable cam 258 from a first rotational position to a second rotational position, driving the longitudinally movable cam 254 from a first longitudinal position to a second longitudinal position, and urging the lock control lug 220 from the locking position toward the unlocking position. The unlocking procedure 410 includes block 412, which generally involves receiving the unlocking signal at a driver 211 of the lock mechanism 200, for example as described above with reference to block 312.

The unlocking procedure 410 includes block 414, which generally involves rotating the ring gear 230 about the longitudinal axis 101 from a first rotational position to a second rotational position, thereby rotating the rotatable cam 258 from its first rotational position to its second rotational position. Block 414 may be performed by the driver 211 and in response to receiving the unlocking signal. Block 414 may, for example, involve rotating the worm 214 through a predetermined angle sufficient to drive the ring gear 230 from its first rotational position to its second rotational position.

The unlocking procedure 410 includes block 416, which generally involves longitudinally driving the longitudinally movable cam 254 from a first longitudinal position to a second longitudinal position. Block 416 may be performed by the cam mechanism 240 and during rotation of the ring gear 230 from the first rotational position to the second rotational position. In the illustrated form, the ring gear 230 comprises the longitudinally movable cam 254, and block 416 involves engaging the ramps 243, 247 with one another to drive the ring gear 230 from its proximal position to its distal position as the ring gear 230 rotates between its first rotational position and its second rotational position as described above. In other forms, such as those in which the ring gear 230 is longitudinally fixed and comprises the longitudinally fixed cam 254, block 416 may involve driving the longitudinally movable cam 254 to its second longitudinal position as the rotatable cam 258 rotates to its second rotational position.

The unlocking procedure 410 may further include block 417, which generally involves maintaining engagement between the ring gear 230 and the longitudinally-extending pinion gear 216 during movement of the ring gear 230 from the first longitudinal position to the second longitudinal position. For example, as the ring gear 230 travels along the longitudinal axis 101, the teeth 233 of the ring gear 230 may travel along the teeth of the pinion 216 while the teeth remain engaged with one another. In other forms, such as those in which the ring gear 230 is longitudinally fixed (i.e., comprises the longitudinally fixed cam 252), block 417 may be obviated or rendered unnecessary.

The unlocking procedure 410 includes block 418, which generally involves urging the lock control lug 220 from its locking position toward its unlocking position. Block 418 may be performed by the longitudinally movable cam 254 and during movement of the longitudinally movable cam 254 from the first longitudinal position to the second longitudinal position. In the illustrated form, block 418 involves the ring gear 230 urging the lock control lug 220 toward its unlocking position via the second spring 204. In other forms, such as those in which the ring gear 230 is longitudinally fixed, the longitudinally movable cam 254 may urge the lock control lug 220 toward its unlocking position via the second spring 204.

The unlocking procedure 410 may further include a misalignment compensation procedure 420. The misalignment compensation procedure 420 may, for example, be performed when the drive spindle 124 and the latch spindle 140 are in the misaligned state. The misalignment compensation procedure 420 generally includes block 422, which generally involves storing mechanical energy in the second spring 204 as a result of movement of the longitudinally movable cam 254 from the first longitudinal position to the second longitudinal position. More particularly, when the lock control lug 220 is blocked from moving to its unlocking position, movement of the longitudinally movable cam 254 (which in the illustrated form is provided on the ring gear 230) from its proximal position toward its distal position compresses the second spring 204, thereby storing mechanical energy in the second spring 204. In response to return of the drive spindle 124 and the latch spindle 140 to the aligned state, the trim assembly 120 may perform block 424, which generally involves driving the lock control lug 220 to the locking position using the mechanical energy stored in the second spring 204 as described above.

In certain embodiments, the process 400 may include block 406, which generally involves receiving a locking input, and block 408, which generally involves transmitting a locking signal to the driver 211. Blocks 406, 408 may, for example, proceed along the lines set for the above with reference to blocks 306, 308.

The process 400 may include a locking procedure 430, which generally involves transitioning the lock mechanism 200 from its unlocked state to its locked state. As described herein, the locking procedure 430 generally includes receiving the locking signal, rotating the ring gear 230, and urging the lock control lug 220 and the lock gear 230 proximally toward the locking positions thereof.

The locking procedure 430 may include block 432, which generally involves receiving the locking signal at the driver 211. In certain embodiments, the locking signal may be one that causes the motor 212 to rotate the worm 214 in an opposite direction as the worm 214 was rotated to unlock the trim assembly 120. In other embodiments, the locking signal may be one that causes the motor 212 to rotate the worm 214 in the same direction as the worm 214 was rotated to unlock the trim assembly 120.

The locking procedure 430 may include block 434, which generally involves rotating the ring gear 230, including the rotatable cam 258, from the second rotational position. Block 434 may be performed by the driver 211 and in response to receiving the locking signal, for example as described above with reference to block 434

The locking procedure 430 may include block 436, which generally involves urging the lock control lug 220 from the unlocking position toward the locking position, for example by the first spring 202. In the illustrated form, the urging of the first spring 202 is transmitted to longitudinally movable cam 254 (e.g., via the second spring 204), thereby urging the longitudinally movable cam 254 from the second longitudinal position toward the first longitudinal position. As a result, in block 438, the longitudinally movable cam 254 returns to the first longitudinal position as the ring gear 230 rotates from the second rotational position (e.g., toward the first rotational position or the third rotational position).

Figure 13:
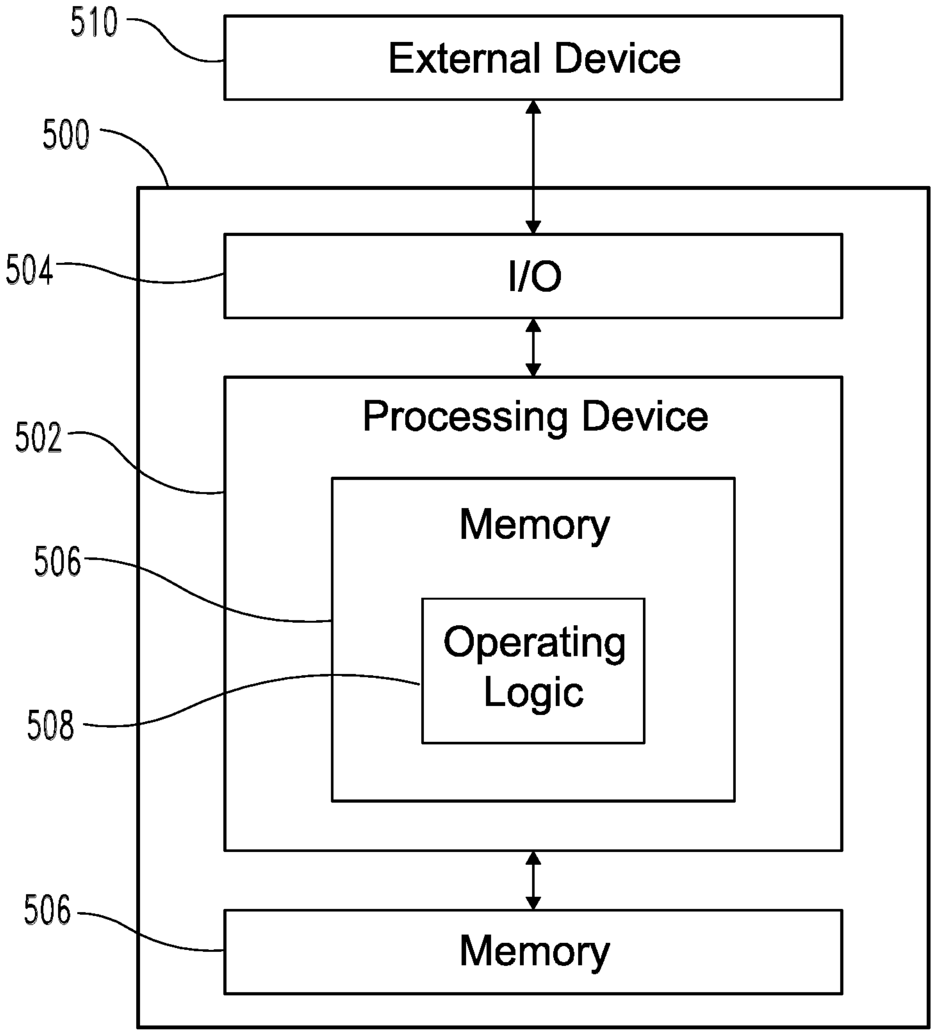
FIG. 13 is a schematic block diagram of a computing device according to certain embodiments.

Referring now to FIG. 13, a simplified block diagram of at least one embodiment of a computing device 500 is shown. The illustrative computing device 500 depicts at least one embodiment of a controller that may be utilized in connection with the controller 152 illustrated in FIG. 3.

Depending on the particular embodiment, the computing device 500 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the credential reader 160, the driver 211, or an external device 190 such as an access control system 192, a mobile device 194, or an external credential reader 196. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 12, it should be appreciated that a particular computing device 500 may include multiple processing devices 502, I/O devices 504, and/or memories 506 in other embodiments. Further, in some embodiments, more than one external device 510 may be in communication with the computing device 500.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock apparatus, comprising:

an escutcheon;

a cam mechanism;

a lock mechanism having a locked state and an unlocked state;

a first spring urging the lock mechanism toward the locked state;

a movable component movably mounted relative to the escutcheon for rotation about an axis and axial movement along the axis;

a second spring engaged between the movable component and the lock mechanism; and an actuator operable to rotate the movable component about the axis;

wherein the cam mechanism is configured to move the movable component axially in response to rotation of the movable component;

wherein the lock mechanism is configured to move between the locked state and the unlocked state in response to axial movement of the movable component; and wherein the second spring is configured to transmit forces between the movable component and the lock mechanism to thereby urge the lock mechanism toward the unlocked state in response to a first axial movement of the movable component.

2. The lock apparatus of claim 1, wherein the cam mechanism comprises a cam surface having a fixed position relative to the escutcheon.

3. The lock apparatus of claim 1, wherein the cam mechanism comprises a cam surface that is integrally formed with the escutcheon.

4. The lock apparatus of claim 1, wherein the movable component comprises a gear.

5. The lock apparatus of claim 4, further comprising a pinion engaged between the gear and the actuator; and wherein the pinion extends in the axial direction and remains engaged with the gear during axial movement of the gear along the axis.

6. The lock apparatus of claim 1, wherein the movable component is annular.

7. The lock apparatus of claim 6, wherein the escutcheon comprises a collar; and wherein the annular movable component is mounted for rotation about the collar.

8. The lock apparatus of claim 1, wherein the actuator comprises a rotary motor.

9. The lock apparatus of claim 1, wherein the second spring has a greater stiffness than the first spring.

10. A method of operating a lock apparatus, the method comprising:

rotating a movable component about an axis, thereby causing a cam mechanism to axially drive the movable component along the axis;

transitioning a lock mechanism between a locked state and an unlocked state in response to axial movement of the movable component;

biasing, by a first spring, the lock mechanism toward the locked state; and moving, by a second spring engaged between the lock mechanism and the movable component, the lock mechanism from the locked state to the unlocked state in response to a first axial movement of the movable component.

11. The method of claim 10, wherein the movable component is mounted within an escutcheon; and wherein the escutcheon defines a cam surface of the cam mechanism.

12. The method of claim 10, wherein the movable component comprises a gear operable to be rotated by a motor; and wherein rotating the movable component about the axis comprises operating the motor.

13. The method of claim 12, wherein the motor is engaged with the gear via a longitudinally-extending pinion; and wherein the method further comprises maintaining engagement between the pinion and the gear as the gear moves axially.

14. The method of claim 10, wherein the movable component is annular; and wherein the method further comprises rotatably supporting the movable component by a collar of an escutcheon.

15. A lock apparatus, comprising:

an escutcheon comprising a cam surface that is integrally formed with the escutcheon;

a lock gear mounted within the escutcheon for rotation about an axis and for axial movement along the axis, wherein the lock gear is engaged with the cam surface such that the lock gear moves between a first axial position and a second axial position as the lock gear rotates relative to the escutcheon; and a rotary motor engaged with the lock gear via a pinion; and wherein the pinion extends longitudinally and is engaged with the lock gear throughout movement of the lock gear between the first axial position and the second axial position.

16. The lock apparatus of claim 15, wherein the motor is operable to rotate a worm, and wherein the worm is engaged with the pinion.

17. The lock apparatus of claim 15, wherein the escutcheon further comprises a collar that rotatably supports the lock gear.

18. The lock apparatus of claim 17, wherein the cam surface comprises a plurality of ramps formed about the collar.

19. The lock apparatus of claim 15, further comprising a lock mechanism configured to move between a locked state and an unlocked state in response to axial movement of the lock gear.

20. A method of operating a lock apparatus, the method comprising:

causing a movable component to perform a first axial movement, comprising rotating the movable component about an axis in a first rotational direction, thereby causing a cam mechanism to drive the movable component along the axis in a first axial direction;

transitioning a lock mechanism from a first state to a second state in response to the first axial movement of the movable component, wherein one of the first state or the second state is a locked state, and wherein the other of the first state or the second state is an unlocked state;

causing the movable component to perform a second axial movement, comprising further rotating the movable component about the axis in the first rotational direction, thereby causing a first spring to drive the movable component along the axis in a second axial direction opposite the first axial direction; and transitioning the lock mechanism from the second state to the first state in response to the second axial movement of the movable component; and wherein transitioning the lock mechanism from a first state to a second state in response to the first axial movement of the movable component comprises causing a second spring to drive a lock control member of the lock mechanism from a first position to a second position as a result of the first axial movement of the movable component.

21. The method of claim 20, wherein the second spring has a greater stiffness than the first spring.

* * * * *